Sept. 17, 1968     R. HAGEN     3,401,818

OPEN TOP TANK AND COVERING FOR THE CONTENTS THEREOF

Original Filed July 2, 1964

INVENTOR
REIHOLD HAGEN

BY *Stevens, Davis, Miller & Mosher*
ATTORNEYS

United States Patent Office 3,401,818
Patented Sept. 17, 1968

3,401,818
OPEN TOP TANK AND COVERING FOR THE CONTENTS THEREOF
Reinhold Hagen, Siegburg, Rhineland, Germany, assignor to Allplas A.G., Zug, Switzerland, a Swiss body corporate
Continuation of application Ser. No. 379,962, July 2, 1964. This application May 15, 1967, Ser. No. 640,438
Claims priority, application Great Britain, July 15, 1963, 27,953/63
5 Claims. (Cl. 220—26)

ABSTRACT OF THE DISCLOSURE

The covering of an open tank containing liquid utilizing a plurality of spheres which are floated on the surface of the liquid to substantially cover same. A circumferential bead, or the like, is formed on each of the spheres to prevent rotation of the spheres in the liquid.

Cross reference to related applications

This is a continuation of applicant's U.S. patent application Ser. No. 379,962, filed July 2, 1964, now abandoned.

Background of the invention (1) *Field of the invention.*—This invention relates to an open tank containing liquid, and more particularly, to a covering for the tank.

(2) *Description of the prior art.*—The open process tank has many applications in modern industry. These tanks usually contain a liquid utilized in various industrial processes, such as electroplating, dyeing, wet spinning, as well as in fabrication of steel articles, sealing of hot wells, insulating of gas hollow water seals, and the like.

Since it is essential in these processes to have unimpeded access to the solution in the tank, the tanks must remain open at their tops. However, this creates many problems, such as liquid loss from heat and evaporation; the production of vapor which is hazardous, inconvenient and unpleasant for operation, and which causes corrosion of the surrounding plant; splashing of the liquid when the various components are dipped into and removed from the tank; and freezing of the liquid in cold weather.

Many steps have been taken to overcome these problems. For example, extractor fans have been utilized to remove the vapors from the plant and protective clothing has been provided for the operators. However, these solutions are totally inadequate since they do not obviate the basic cause of the problem—the uncovered liquid surface.

It also has been proposed to provide a plurality of hollow bodies of various shapes to cover the liquid surface. For example, in German Patent 1,060,323 a plurality of hollow floating bodies are provided which have a foamed structure incorporating a plurality of cavities, along with raised portions and trough-like depressions. However, these bodies suffer in two major respects. Due to their irregular shape, a substantial amount of evaporation losses are still present. Also, when the bodies are initially fed to the surface of the liquid, they tend to pile up upon one another rather than orienting themselves to cover the complete liquid surface. Also, when various components are removed from the tank, the bodies are displaced and move on to the top of the adjacent bodies to form a pile, thus leaving a hole in the covering.

German Patent 1,031,768 proposes to cover the tank by providing a plurality of hollow spheres on the surface of the liquid. Although some of the above disadvantages are eliminated by this method, it was discovered that these hollow spheres rotate in the surface of the liquid, causing a substantial evaporation of the liquid.

Summary of the invention

It is therefore an object of the present invention to produce a covering for the liquid surface in an open process tank which substantially eliminates all of the above disadvantages while permitting a uniform covering of the tank, unimpeded access thereto, and an increased prevention of evaporation losses.

Briefly summarized, the present invention relates to the covering of liquid in an open tank by floating on the surface of the liquid a plurality of spheres which are prevented from rotating so that the entire surface of the liquid is substantially covered and evaporation losses minimized.

Brief description of the drawings

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope. In the drawings.

Description of the preferred embodiments

Figure 1:
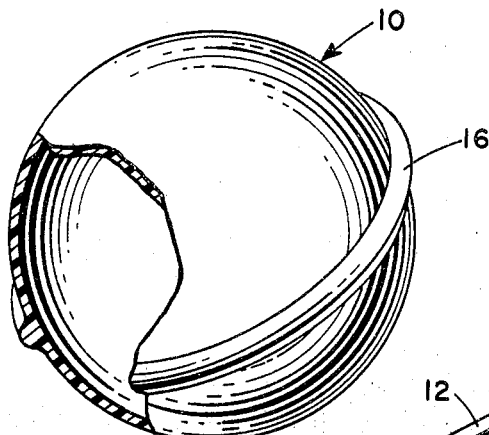
FIG. 1 is a perspective view, partially in section, of a molded hollow sphere utilized in the present invention.
Figure 2:
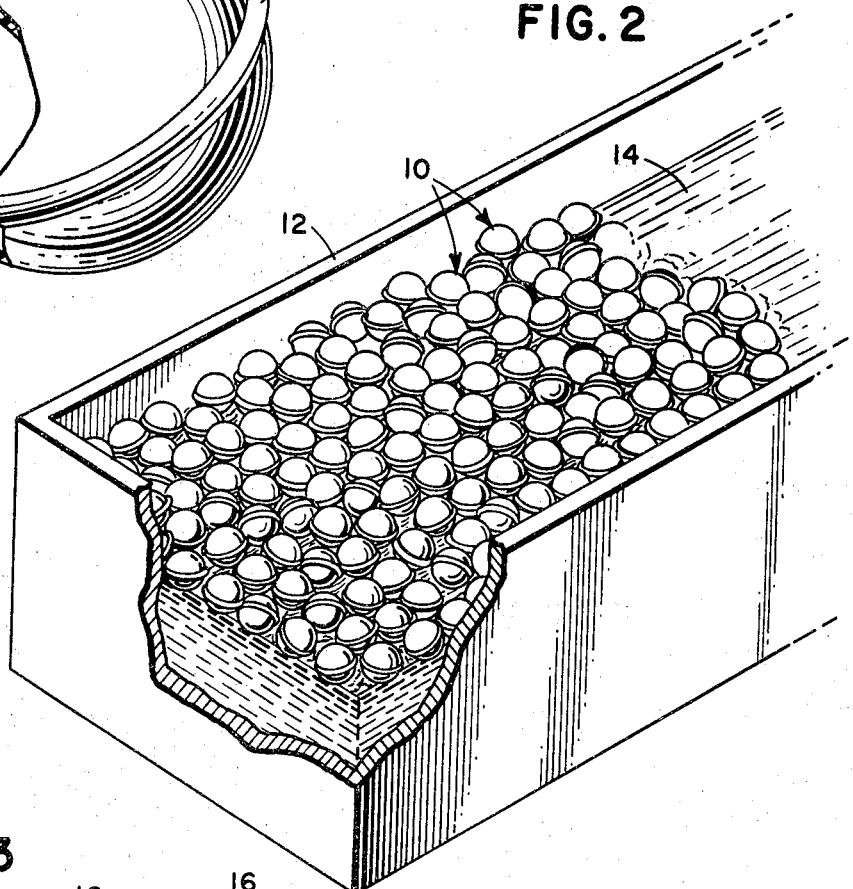
FIG. 2 is a perspective view, partially in section, of a plurality of these spheres covering the liquid in an open process tank.

Referring specifically to FIG. 1, reference numeral 10 refers to a plastic sphere utilized in the present invention. These spheres may be hollow and may be made of polypropylene, which is resistant to corrosive solutions and which can withstand a temperature up to 145° C. As an alternate they may be solid, but made of a material which floats in liquid. The spheres may be of any diameter, such as from ¾ inch to 6 inches, and, when placed over an open tank 12 as shown in FIG. 2, they orient themselves to cover approximately 90% of the surface of the liquid 14.

In order to substantially eliminate all rotation of the spheres after they have covered the liquid, and thus obtain maximum prevention of evaporation losses, a circumferential bead 16 is formed about the outer surface of each sphere 10 as seen in FIG. 1. Although bead 16 prevents rotation of the spheres, it permits complete self-orientation of the spheres after they have been initially piled on top of the liquid.

Of course any other suitable form of bead may be utilized as long as the above conditions are maintained. For example, the bead may be provided with a number of flattened protrusions of regular or irregular shape. If the bodies are used exclusively for preventing evaporation, or other losses, from the surface of a liquid, then the protrusions, which may advantageously be rectangular, ellipsoidal or triangular, and which may extend in the plane of the bead, will engage a protuberance on an adjacent body and thereby completely eliminate rotation of the bodies.

Figure 3:
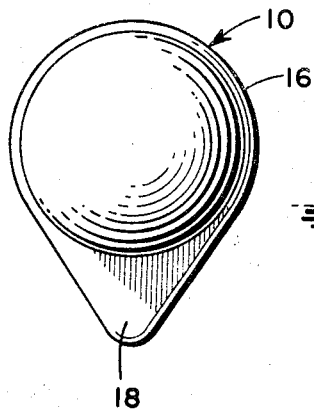
FIG. 3 is a front elevational view of an alternate shape of the hollow sphere.
Figure 4:
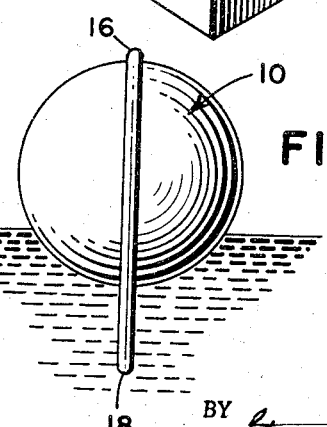
FIG. 4 is a side elevational view of the sphere of FIG. 3.

Also, a portion of the bead may be enlarged to form a triangular shaped flange or fin 18 of the same width as the bead which serves as a keel as shown in FIGS. 3 and 4.

The advantages of the present invention are numerous. As previously indicated, evaporation or other losses from the surfaces of volatile liquids, including petrol spirit, crude oil, benzene, solvent naphtha and ammoniacal liquor is prevented. Also, the evaporation of water, particularly in hot climates, and freezing of water in cold conditions is prevented.

The present invention has additional advantages over other arrangements by allowing ready insertion and withdrawal of feed pipes and by eliminating any interference with the ball cock control of a feed and any pile-up of the spheres. For example, in plating baths the insertion and withdrawal of workpieces and their supports into and from the tank is permitted. In dyeing machines and related machines for the treatment of textile fabrics, the fabric may be run continuously in and out of the bath by use of a winch machine. In the wet spinning of artificial filaments, the bundle of filaments may be drawn out of the coagulating bath in the usual way without materially increasing the tension in the filament, while permitting the spinning nozzle to be readily accessible at the same time. Also, the present invention may be used advantageously in photographic baths. Of course, in all of the above applications the covering of spheres reforms immediately after a component enters or leaves the tank.

As an example of the application of the present invention, applicant discovered that, in an insulated open top tank of 24 sq. ft. of free surface area, the heat required to maintain water in the tank at 90° C. fell from 14.4 kw. hours to 4.34 kw. hours, and the loss of water by evaporation was reduced from 1.54 lbs./ft.$^2$ per hour to 0.182 lb./ft.$^2$ per hour, when the covering of the present invention was used. This represented a fuel saving of 69.5% and a reduction of 88.3% evaporative losses. Also, an additional layer of spheres resulted in a further 5–6% improvement.

As an indication of a further advantage, it was discovered that when the covering of the present invention was utilized on three tanks, which respectively contained a pickling solution of 5% sulphuric acid at 65° C., a water rinse at the same temperature, and a pickling solution of 2% phosphoric acid at 85° C., normal visibility was achieved above the tanks, whereas before it was impossible to perform any kind of related operations around the tank which required visibility.

In addition to the above, the covering of the present invention may be utilized to seal engine room hotwells in order to prevent steam from escaping therefrom. For example, the hollow spheres may be poured through the well on to the liquid therein, at which time they automatically arrange themselves around any obstructions in the tank to form what is virtually a flexible liquid in a closely packed layer.

Also, the present invention may be utilized to insulate gas holder water seals to prevent the water seals from freezing and thus eliminating costly heating of the water. In this application small strip metal deflectors may be utilized in conjunction with spiral guided holders to prevent the hollow spheres from being carried up the sloping guides as the holder rises.

Of course, variations of the specific construction and arrangement of the invention herein disclosed can be made by those skilled in the art without departing from the invention as defined in the appended claims.

I claim:

1. In combination, an open tank containing liquid, and a plurality of spheres floating on the surface of said liquid and covering same, each of said spheres having a great circle bead of uniform thickness and radial width formed thereon, the width and the weight of said bead being such that said spheres are prevented from rotating in said liquid, while being self-orienting with respect to said liquid surface so that they reform over any portion of said surface through which an article is passed.

2. The combination of claim 1, wherein said spheres are hollow.

3. The combination of claim 1, wherein said spheres are plastic.

4. In combination, an open tank containing liquid, and a plurality of spheres floating on the surface of said liquid and covering same, each of said spheres having a triangular shaped fin extending radially outwardly therefrom of sufficient weight to prevent rotation of the spheres in the liquid once the fin has assumed a position beneath the center of the floating sphere.

5. The combination of claim 4, wherein said spheres are hollow.

References Cited

UNITED STATES PATENTS

| | | | |
|---|---|---|---|
| 1,404,924 | 1/1922 | Bloss | 220—26 |
| 2,710,832 | 6/1955 | Harr | 220—26 |
| 3,292,840 | 12/1966 | Schmidt | 229—8 |

FOREIGN PATENTS

| | | |
|---|---|---|
| 366,281 | 10/1906 | France. |
| 1,192,877 | 4/1959 | France. |
| 1,060,323 | 6/1959 | Germany. |
| 269,706 | 4/1927 | Great Britain. |

THERON E. CONDON, *Primary Examiner.*

J. R. GARRETT, *Assistant Examiner.*